Feb. 11, 1936.  W. H. BELL  2,030,194

TANK WASHING AND WATERING DEVICE

Filed March 24, 1934

INVENTOR

Walter Holt Bell

Patented Feb. 11, 1936

2,030,194

UNITED STATES PATENT OFFICE 2,030,194

TANK WASHING AND WATERING DEVICE

Walter Holt Bell, New York, N. Y.

Application March 24, 1934, Serial No. 717,257

1 Claim. (Cl. 299—69)

This invention relates to devices for washing out oil carrying ship tanks, so as to remove the debris or waste which settles in the bottom of the tank, and also to free the tank of gas which fills it, and forms a source of serious danger of explosion and fire.

One of the objects of the invention is to provide a water rotated device, including a plurality of nozzles, and a gearing, whereby the nozzles will be rotated around horizontal axes, while the entire device will turn on a vertical or other axis, so that the water jets projected from the rotating nozzles will sweep the entire interior of an oil tank, producing heavy streams for washing out the bottom of the tank, and sprays for trapping the gas and effecting its removal from the tank.

With the above and other objects in view the invention consists in certain new and useful constructions, combinations and arrangements of parts, clearly described in the following specification, and fully illustrated in the accompanying drawing, in which:—

Figure 5:
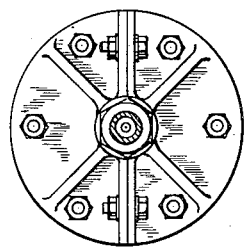
Fig. 5 is a horizontal sectional view taken on line 5—5 of Fig. 1.
Figure 2:
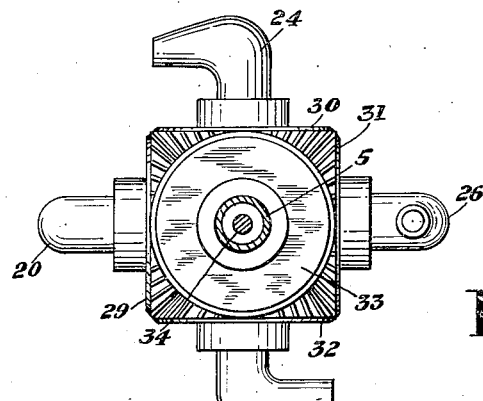
Fig. 2 is a horizontal sectional view, taken on line 2—2 of Fig. 1.
Figure 1:
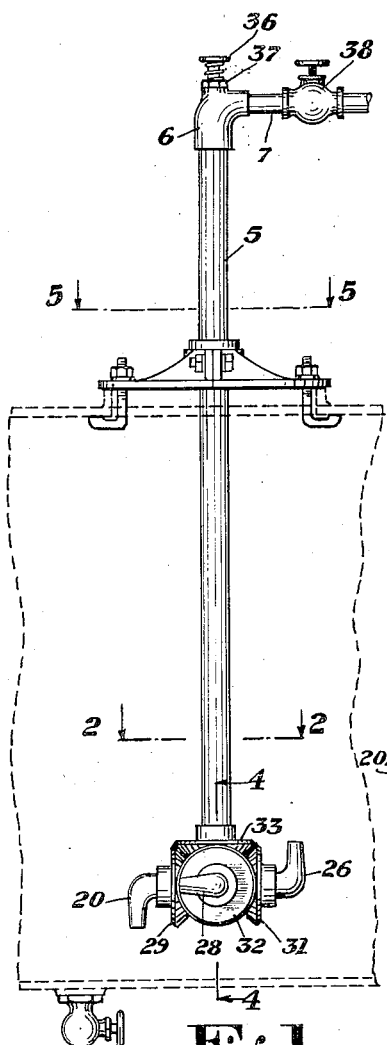
Fig. 1 is a side elevation of the device shown installed in an oil ship tank.
Figure 3:
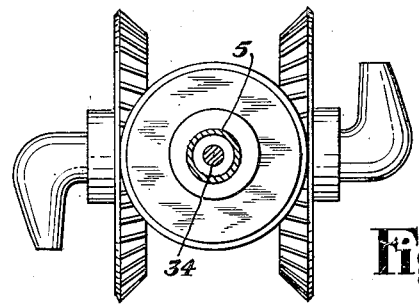
Fig. 3 is a vertical sectional view, taken on line 3—3 of Fig. 1.
Figure 4:
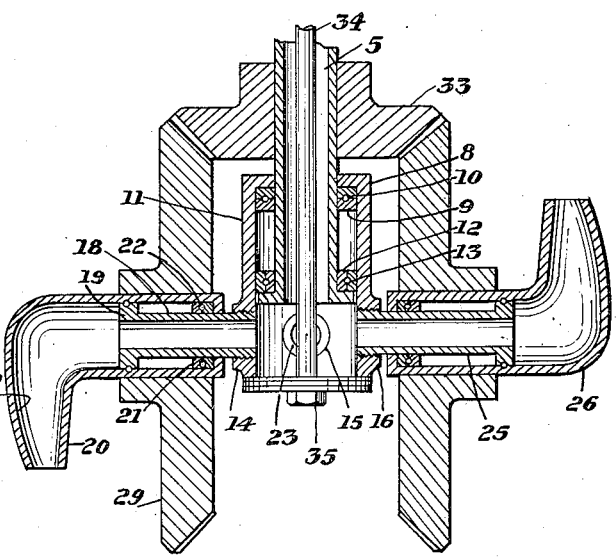
Fig. 4 is a detail vertical sectional view through a member of the intake pipe, showing the speed regulating adjustment thereof.

Referring to the accompanying drawing illustrating the practical embodiment of my invention, 5 designates a water pipe, which is equipped on its upper end with an elbow or lateral intake member 6, to which the supply hose or pipe 7 is coupled in any suitable manner.

The lower end of the pipe 5 is enclosed by the tubular housing 8, and is provided with a nut or shoulder 9 and a ball bearing 10 supported thereby, which is engaged by the annular end wall 11 of the housing 8. Below this a bearing collar 12 is attached to the pipe, and this may be provided with a ball bearing 13, which engages the inner surface of the housing 8.

The housing 8 is formed with a plurality of radially disposed integral sockets 14, 15, 16 and 17, which are located below the bearing collar 12. In the socket 14 the inner end of the tubular shaft 18 is threaded or otherwise coupled in fixed position. The outer end of this tubular shaft is equipped with a collar 19, and on this shaft the horizontal arm of the L-shaped nozzle 20 is mounted, being held against endwise movement by means of the bearing collar 21 which is mounted on the tubular shaft 18. This bearing collar may be equipped with a ball bearing 22, to reduce the friction between the nozzle 20 and the tubular shaft 18 which supports it. The discharge arm 22a of the shaft tapers toward its outlet to produce a concentrated jet action on the water which discharges through it.

In the outlet or socket 15 a tubular shaft 23 is fixed, on which the nozzle 24 is similarly mounted for rotation. In the socket 16 a tubular shaft 25 is fixed, which carries the nozzle 26, mounted to rotate thereon, similar to the nozzle 20. In the socket 17 a tubular shaft 27 is fixed, on which the nozzle 28 is mounted for rotation, in the manner described with reference to the nozzle 20. The nozzles 24, 26 and 28 are duplicates of the nozzle 20, each being of L-shaped construction.

On the inner arm of the nozzle 20 the bevel gear 29 is fixed, on the inner arm of the nozzle 24, a bevel gear 30 is fixed, on the inner arm of the nozzle 26 a bevel gear 31 is fixed, and on the inner end of the nozzle 28 a bevel gear 32 is fixed.

The four bevel gears 29, 30, 31 and 32 simultaneously engage the bevel gear 33 which is fixed to but does not rotate with the pipe 5. A rod 34 extends centrally through the pipe 5 and is equipped on its lower end with a friction head 35, which bears against the lower end of housing 8. The upper end of this rod extends through the intake member 6, and is engaged by a nut 36, which is designed to be adjusted against the packing or friction washer 37, so that the frictional pressure of the friction head 35 against the lower end of housing 8 may be regulated, to retard the rotation of the housing 8.

By regulating the frictional resistance to the rotation of the nozzle carrying head or housing, the action of the jets projected from the nozzles against any particular area or zone of the oil tank of the ship, which is to be cleaned out, may be prolonged, so that an intensive scouring action may be effected. This frictional resistance may be even increased to the point where rotation of the nozzles is prevented.

Water is admitted under pressure to the pipe 5, by means of the controlling valve 38, and discharges at great velocity, in the form of scouring jets or streams, from the tapered horizontal arms of the four nozzles. The water jets discharging through the four nozzles develop a reaction against the atmosphere, which causes the nozzles to move in a reverse direction to the discharge of the water. A movement thus generated in the nozzles causes the tubular wall 11 to turn on the pipe 5 and each nozzle is equipped with a gear in constant meshing engagement with the fixed bevelled gear 33, each nozzle is caused to turn on its own axis as all of the nozzles are caused to swing around the water pipe 5, which is always held against turning by the overhead support.

A plurality of jets, which rotate around horizontal axes, and constantly shift their point of attack or discharge, due to the turning of the entire nozzle assembly on the pipe 5, is thus introduced in the ship oil tank.

The nozzles are so arranged so that when one nozzle is discharging downwardly the one on the opposite side of the head will be disposed upwardly and discharging in the same direction, and at the same time the nozzle which is discharging in one horizontal direction, of the remaining two nozzles, will be balanced by the opposing nozzle discharging in the opposite horizontal direction.

It will thus be seen that at all times a balanced discharge of the jets of the water, in four opposing directions, will result from the operation of the device. Water in strong scouring jets and in gas trapping sprays will be discharged into the ship oil tank. Additional spray jets may be provided through the medium of spray jet openings 39 formed in the different nozzles.

The improved nozzle head may also be used for extinguishing ship fires.

Having described my invention I claim as new:—

The tank washing device consisting of a supporting pipe, means for clamping the same adjacent to the opening of a tank to support the pipe inwardly of the tank, means for supplying water to the pipe, a rod extending through the pipe and outwardly of both ends thereof, a beveled gear mounted on the pipe above the lower end thereof, a member mounted to rotate on the pipe below the gear, tubular shafts mounted on said member at right angles thereto, L-shaped water jet nozzles mounted to rotate on said tubular shafts and having their outer ends arranged to project jets in angular relations to said shafts, said tubular shafts communicating with the supporting pipe and arranged to discharge water to the nozzles, a beveled gear on each nozzle having meshing engagement with the first beveled gear, said member having a bearing located below the tubular shafts, a friction element mounted on the lower end of the rod to engage said bearing and means on the upper end of the rod for varying the pressure on said friction element against the bearing to regulate the speed of rotative movement of said nozzles and gears.

WALTER HOLT BELL.